(12) United States Patent
Murthy et al.

(10) Patent No.: US 7,275,231 B2
(45) Date of Patent: Sep. 25, 2007

(54) HIGH LEVEL VALIDATION OF DESIGNS AND PRODUCTS

(75) Inventors: Praveen Kumar Murthy, Fremont, CA (US); Sreeranga P. Rajan, Sunnyvale, CA (US); Koichiro Takayama, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 10/941,324

(22) Filed: Sep. 15, 2004

(65) Prior Publication Data

US 2006/0059444 A1    Mar. 16, 2006

(51) Int. Cl.
*G06F 17/50* (2006.01)

(52) U.S. Cl. .................. 716/16; 716/4; 716/5

(58) Field of Classification Search .......... 716/16, 716/4, 5
See application file for complete search history.

(56) References Cited

U.S. PATENT DOCUMENTS 5,488,570 A * 1/1996 Agarwal .................. 345/501
5,867,494 A * 2/1999 Krishnaswamy et al. ... 370/352

OTHER PUBLICATIONS

IBM, "The Views Method and Tool", Dec. 1, 1994, IBM_TDB, vol. 37, iss. 12, pp. 645-647.*

* cited by examiner

*Primary Examiner*—Sun James Lin
(74) *Attorney, Agent, or Firm*—Baker Botts L.L.P.

(57) ABSTRACT

A method for high level validation of a design includes receiving input associated with a design; generating a message diagram in response to the input, wherein the message diagram describes a relationship of messages communicated between multiple processes; resolving at least one scenario from the message diagram, wherein the scenario comprises a particular sequence of messages identified by the message diagram; generating a state machine operable to receive and transmit at least some of the messages identified by the message diagram according to the scenario; and testing an implementation of the design using the state machine.

40 Claims, 8 Drawing Sheets

HIGH LEVEL VALIDATION OF DESIGNS AND PRODUCTS

TECHNICAL FIELD OF THE INVENTION

The present invention relates generally to validation of designs and products, and, more particularly, to high level validation of designs and products.

BACKGROUND OF THE INVENTION

Advances in hardware and software technologies have provided a foundation for increasingly complicated designs. However, known techniques for testing designs are inefficient and less than comprehensive. For example, currently there is not an efficient, comprehensive technique for evaluating circuit designs.

SUMMARY OF THE INVENTION

In accordance with the present invention, techniques for high level validation of designs and products are provided. According to particular embodiments, these techniques enable the testing and validation of designs and products at a high level of abstraction using powerful and expressive message diagrams.

According to a particular embodiment, a method for high level validation of a design includes receiving input associated with a design; generating a message diagram in response to the input, wherein the message diagram describes a relationship of messages communicated between multiple processes; resolving at least one scenario from the message diagram, wherein the scenario comprises a particular sequence of messages identified by the message diagram; generating a state machine operable to receive and transmit at least some of the messages identified by the message diagram according to the scenario; and testing an implementation of the design using the state machine.

Embodiments of the invention provide various technical advantages. Particular embodiments provide tools for use in specifying, testing, and validating designs and products. Development tools may allow designers to specify an input/output protocol at a high level of abstraction. For example, message diagrams may be generated to provide comprehensive, high-level "golden model" descriptions of designs. These message diagrams may be used to generate state machines for use in testing the designs and/or products. The message diagrams may also be used to identify scenarios to be tested using the state machines. According to particular embodiments, the state machines may be automatically generated in a descriptive language and be ready for simulation as generated. Furthermore, the state machines may be able to test every aspect of the specification. According to particular embodiments, these techniques may ensure that designs conform to standards. Additionally, time invested in testing and validating a design may be significantly reduced.

Other technical advantages of the present invention will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which.

DETAILED DESCRIPTION OF THE INVENTION

Figure 1:
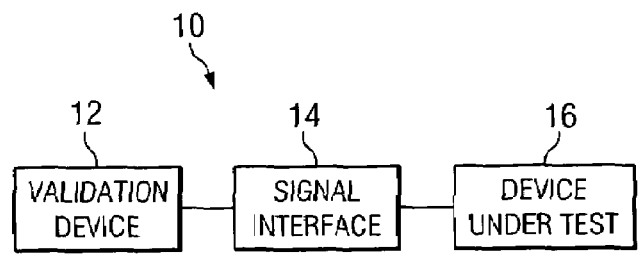
FIG. 1 illustrates a testing system that includes a validation device for high level validation of designs and products.

FIG. 1 illustrates a testing system 10 that includes a validation device 12, a signal interface 14, and a device under test 16. In general, validation device 12 provides for high level validation of designs and products. More specifically, validation device 12 includes tools for generating message diagrams that act as design specifications. Validation device 12 also includes tools for generating a state machine based on the message diagram to validate operation of an implementation of the design. Thus, according to particular embodiments, validation device 12 communicates through signal interface 14 with device under test 16 to determine whether device under test 16 operates in accordance with a design specification indicated by a message diagram.

Validation device 12 represents any suitable combination of hardware and software operable to provide for high level validation of designs and products. According to particular embodiments, validation device 12 may be a general purpose computer running an operating system and one or more application programs. According to other embodiments, validation device 12 may be a specially-designed piece of equipment, multiple linked general purpose computers, or any other suitable combination of appropriate hardware and software.

Signal interface 14 represents equipment for coupling validation device 12 to device under test 16. Signal interface 14 may convert signals communicated by validation device 12 to signals appropriate for use by device under test 16.

Similarly, signal interface 14 may convert signals communicated by device under test 16 to signals appropriate for use by validation device 12. Thus, signal interface 14 may include hardware and/or software. Note that in alternative embodiments of testing system 10, signal interface 14 may be omitted. For example, if validation device 12 and device under test 16 utilize compatible signals, signal interface 14 may be omitted.

Device under test 16 represents a software module and/or a hardware component or system to be tested and validated by validation device 12. According to particular embodiments, device under test 16 is a design prototype produced during development of a product. According to other embodiments, device under test 16 is a state machine generated by validation device 12.

In operation, validation device 12 supports capture of design requirements and high level design specifications. For example, requirements typically described in informal natural language may be specified using a formal visual language. The formal visual language may be created using any appropriate programming language or other tool. For example, any of various visual design languages may be utilized or modified, such as message sequence charts (MSC), the sequence diagram model of unified modeling language (UML), the labeled transition system analyzer (LTSA) developed at Imperial College in London, or any other appropriate visual modeling language or tool. Using a formal visual language, a high level design specification may be generated. For example validation device 12 may be used by a designer to record design specifications at an early point in time in the design process, for instance before a decision has been made regarding what portion of the design will be produced in hardware and what portion will be produced in software.

A high level of abstraction may be achieved by validation device 12 making a development tool available to a designer for capturing designs using message diagrams. As used herein, a message diagram includes any graphical representation of the communication of messages between processes. Furthermore, as used herein, processes represent concurrent operations that can communicate information. Thus, processes may be associated with physically or conceptually separate entities that may communicate the messages.

According to particular embodiments, a message diagram may be organized in a hierarchical fashion. For example, a message diagram may include a directed graph and multiple granular message diagrams. The directed graph may allow for a compact representation of a design. The directed graph may organize multiple granular message diagrams into a flowchart with branches and merges indicating relationships between the granular message diagrams. The relationships may order the granular message diagrams into one or more sequences. Each granular message diagram, on the other hand, may depict relationships between processes. The granular message diagrams may identify messages communicated between processes and indicate orders that at least some messages are communicated.

According to a particular embodiment, a design may be represented by one directed graph, which includes multiple granular message diagrams. However, according to other embodiments, a design may be represented by a single flattened message diagram. The flattened message diagram may indicate orders of messages communicated between processes. Furthermore, according to still other embodiments, a design may be represented by multiple directed graphs and multiple granular message diagrams embedded in one another.

As stated above, a development tool may be used to generate directed graphs and granular message diagrams. According to particular embodiments, the development tool may allow a designer to create a directed graph. For example, the designer may create the directed graph by drawing granular message diagrams using shapes. Then, the designer may indicate the relationships between the granular message diagrams using arrows to interconnect the shapes. The arrows may indicate possible paths through the directed graph. Furthermore, the designer may label the granular message diagrams in the directed graph.

The designer may also use the development tool to generate granular message diagrams. Granular message diagrams include processes and messages. The designer may create a granular message diagram by drawing processes using shapes with lines extending from each shape. Then, the designer may indicate relationships between the processes using arrows to show messages communicated between the processes. For example, arrows may be drawn to couple one process line to another process line. Furthermore, processes and messages may be labeled by the designer. The order in which messages are communicated may be represented by positions of the arrows.

Additional design features and requirements may be indicated in granular message diagrams. Simultaneous events may be indicated. For example, two or more messages that are sent or received by a process may be required to be sent or received simultaneously. Note that simultaneous, as it is used in this context, does not necessarily mean "at the same time" and may mean "within some defined period." This period may be defined as an amount of time. For example, the period may be a very short time period used to describe operation of tightly-synchronized hardware. According to particular embodiments, to indicate that two or more events occur simultaneously, a box may be drawn around the events in a granular message diagram.

Another advanced feature involves the ability to represent timeouts. Timeouts require that execution pause. The time period associated with the timeout may be predetermined or identified by a user. According to particular embodiments, to indicate that a timeout should occur, a box may be drawn in a granular message diagram. The label of the box may indicate the time period associated with the timeout. Note that, according to particular embodiments, timeouts and simultaneous events may be combined. For example, messages may be transmitted or received simultaneously upon completion of a timeout period.

Yet another advanced feature involves synchronization of otherwise unordered messages. According to particular embodiments, synchronization edges may be included in a granular message diagram to create an order between unrelated messages. The synchronization edges may not actually represent communicated messages, but instead may only represent an order of other messages communicated between the two processes. According to particular embodiments, to synchronize two unrelated messages, a third message may be drawn and labeled as a synchronization edge. The synchronization edge may create an ordered relationship with the first message as well as the second message. These two relationships may indicate a relationship between the first message and the second message.

Validation device 12 may be used to test a system whose behavior can be validated through observing input-output behavior. For example, reactive systems whose behavior is defined by the manner in which they interact with an environment can be validated purely through input-output behavior. Thus, by describing message exchanges in a message diagram, reactive systems may be validated using message diagrams. At the abstract level at which message diagrams model reactive systems, behavior may be abstracted as one or more transmit processes that send messages to the outside world and one or more receive processes that receive messages from the outside world. Synchronization messages may be transmitted between transmit and receive modules in order to enforce signal ordering constraints. Examples of reactive systems include protocol and physical layer specifications of many types of communication protocols. Some such protocols include PCI-express, universal serial bus (USB), Firewire, and other appropriate protocols and standards.

Thus, according to particular embodiments, the message diagrams may be treated as an abstract, formal, golden model of the design and used to test functional aspects of the design. For example, validation device 12 may use the message diagrams to generate software code for use in validating designs and products. The software code may act as a state machine to interact with device under test 16 according to the message diagram. If device under test 16 interacts with the state machine according to the message diagram, device under test 16 may be said to conform to the standard underlying the message diagram. If device under test 16 fails to interact with the state machine according to the message diagram, the error may be identified and investigated. Thus, according to particular embodiments, the generated code may be used as a golden model for use in testing and validating operation of an implementation of the design. The generated code may be labeled interactor code since the code interacts with device under test 16.

To generate interactor code, a user of validation device 12 may identify a module to fulfill the role of the transmitting process and a second module to fulfill the role of a receiving process. According to particular embodiments, using these inputs, validation device 12 may generate interactor code that may function as the outside world to communicate with the system specified in the message diagram. Specifically, for any particular scenario, the interactor code may receive all of the messages sent by the transmit process, and the interactor code may send all messages received by the receiving process. In this way, the interactor code can validate behavior of a system by analyzing appropriate and unexpected messages from the system. According to particular embodiments, interactor code may be generated in a hardware description language, such as Verilog. Furthermore, the interactor code may create a state machine that interacts with device under test 16 according to one or more scenarios.

As used herein, a scenario represents a particular order and combination of messages communicated between processes. The development tool may identify scenarios using the message diagrams. For example, each path through a directed graph represents a scenario composed of messages identified by granular message diagrams in the path. For complex message diagrams, for example message diagrams including numerous granular message diagrams, multiple scenarios may be possible.

Various methods may be used to identify scenarios for use in testing a design. For example, testing a design may include identifying and testing every granular message diagram in a directed graph. Another method would require identifying and testing every combination of two granular message diagrams in the order indicated in the directed graph. This method may be named edge coverage since it requires that every edge in a directed graph be tested. Edge coverage allows testing of every transition between granular message diagrams. According to particular embodiments, edge coverage involves use of a postman algorithm to generate a postman tour of a directed graph. Yet another method of testing a design would require identifying and testing every possible complete path through a directed graph. The development tool may be able to identify scenarios for testing the design according to any of these methods. However, identifying and testing every possible path in a directed graph may require involve thousands or hundreds of thousands of scenarios, depending on the size and detail of the directed graph. Thus, edge coverage provides a useful and efficient measure for testing a design.

In addition to these methods, the development tool may be able to identify and test other scenarios using other methods. For example, a user may direct the development tool to test a particular path through the directed graph. Furthermore, the development tool may identify all scenarios between two granular message diagrams identified by the user for testing.

Using the interactor code discussed above, the state machine may run on validation device 12 and interact with device under test 16 through signal interface 14. Messages may be communicated through signal interface 14 between validation device 12 and device under test 16 to determine whether device under test 16 transmits and receives messages according to the specification as the specification is defined in the message diagram. One or more tests may be run using the sequence of messages identified in the scenarios. For example, a scenario generated according to edge coverage may be used to test device under test 16.

Thus, testing system 10 allows an implementation of a design to be tested and validated. Validation device 12 creates a message diagram that represents a golden model of a design, generates interactor code based on the message diagram, and identifies one or more scenarios based on the messages diagram. Using the interactor code and the scenarios, validation device 12 interacts with device under test 16 through signal interface 14 to determine whether device under test 16 conforms to the specification defined by the message diagram.

Figure 2:
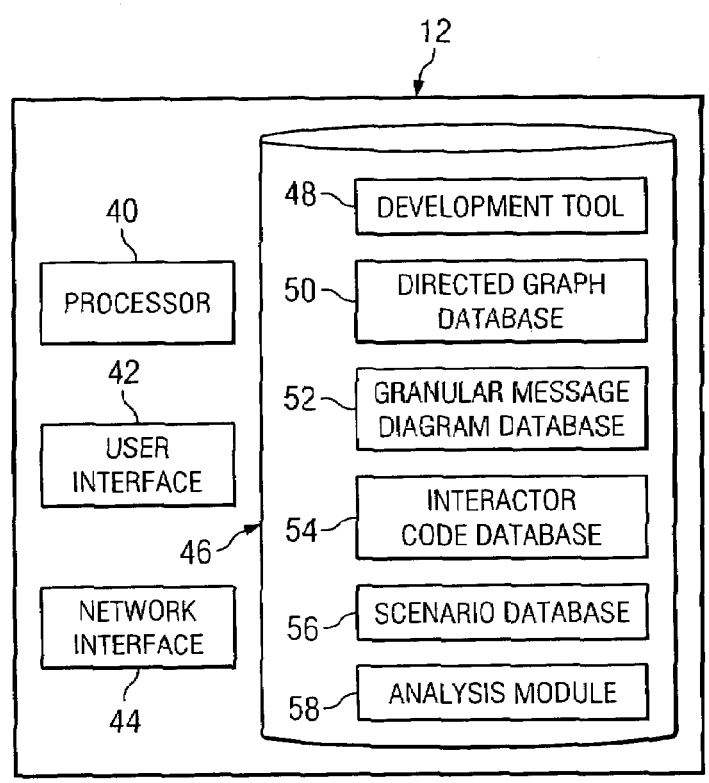
FIG. 2 is a block diagram illustrating exemplary functional components of the validation device.

FIG. 2 is a block diagram illustrating exemplary functional components of validation device 12. In the embodiment illustrated, validation device 12 includes a processor 40, a user interface 42, a network interface 44, and a memory 46. These functional components can operate to provide high level validation of the designs and products.

Processor 40 represents any hardware and/or logic elements operable to control and process information. Processor 40 controls the operation and administration of elements within validation device 12. For example, processor 40 operates to process information received from user interface 42, network interface 44, and memory 46. Thus, processor 40 may be a programmable logic device, a controller, and/or any other suitable processing device.

User interface 42 represents hardware for inputting information into validation device 12 and outputting information from validation device 12. For example, user interface 42 may receive input from a user of validation device 12 regarding development of a message diagram. User interface 42 may also display information regarding a message diagram, interactor code, and/or scenarios to a user of validation device 12. Thus, user interface 42 may include a keyboard, mouse, display, and/or other appropriate devices for inputting and outputting information.

Network interface 44 represents hardware and/or software operable to communicate information to and receive information from devices coupled to validation device 12. For example, network interface 44 may communicate with signal interface 14 and/or device under test 16. Thus, network interface 44 includes any suitable hardware or controlling logic to communicate information to or from elements coupled to validation device 12.

Memory 46 represents any one of a combination of volatile or non-volatile local or remote devices suitable for storing information. Memory 46 stores, either permanently or temporarily, data and other information for processing by processor 40 and communication using user interface 42 and/or network interface 44. For example, memory 46 may include random access memory (RAM), read only memory (ROM), magnetic storage devices, optical storage devices, or any other suitable information storage device or a combination of these devices. As illustrated, memory 46 may include one or more memory modules.

Development tool 48 includes software, executable files, and/or appropriate logic modules capable when executed to interact with a user of validation device 12. For example, development tool 48 allows a user to develop message diagrams, generate interactor code, and identify scenarios for validating a design. Directed graph database 50 stores directed graphs describing relationships between granular message diagrams. Granular message diagram database 52 stores granular message diagrams describing relationships between processes and messages communicated between the processes. Interactor code database 54 stores interactor code for use in validating a design, where the interactor code is automatically generated by validation device 12 based on directed graphs stored in directed graph database 50 and granular message diagrams stored in granular message diagram database 52. Scenario database 56 stores files identifying scenarios for use by interactor code in validating a design. Analysis module 58 includes software, executable files, and/or appropriate logic modules capable when executed to analyze behavior of device under test 16 during interaction with validation device 12.

In operation, a user of validation device 12 utilizes development tool 48 to generate directed graphs stored in directed graph database 50 and granular message diagrams stored in granular message diagram database 52. The user may communicate input through user interface 42 to identify and create graphical representations of processes and messages. Furthermore, the user may utilize advanced features supported by development tool 48 to create simultaneity constraints, timeout constraints, and synchronization edges. Thus, using development tool 48, a user may generate a specification of a design.

Furthermore, a user may cause development tool 48 to generate and store interactor code in interactor code database 54. For example, the user may select an option in development tool 48 to generate interactor code. The user may be prompted to identify a receiving process and a transmitting process. Thereafter, development tool 48 may automatically generate interactor code. According to particular embodiments, the interactor code may operate as a state machine to interact with device under test 16 to validate operation of device under test 16. The interactor code may utilize one or more scenarios to determine when to transmit messages to and receive messages from device under test 16.

A user may cause development tool 48 to identify and store scenarios in scenario database 56 based on relationships of granular message diagrams in a directed graph. One or more scenarios may be resolved by analyzing message diagrams in various ways. For example, development tool 48 may identify all possible scenarios given a particular directed graph and particular granular message diagrams. Scenarios may also be resolved by tracing every edge of a directed graph. Alternatively or in addition, development tool 48 may identify scenarios based on inputs received from the user indicating particular granular message diagrams in a particular directed graph. For example, scenarios may be generated by a user identifying a particular path through a directed graph. Scenarios may also be identified based on resolving all paths between two granular message diagrams in a particular directed graph. Furthermore, scenarios may be identified by composing two granular message diagrams to identify every possible combination of messages included in the two granular message diagrams.

Analysis module 58 may analyze performance of device under test 16. For example, analysis module 58 may identify when messages are communicated from device under test 16 at an unexpected time. Analysis module 58 may also identify when no messages are communicated from device under test 16 when a message is expected. Using the performance of device under test 16, analysis module 58 may determine whether device under test 16 conforms to a specification represented by a directed graph and a granular message diagram.

Thus, the elements of validation device 12 may act to validate designs and products at a high level of abstraction. A user may interact with development tool 48 to generate directed graphs and granular message diagrams. Development tool 48 may generate interactor code and identify scenarios based on the directed graphs and granular message diagrams. The interactor code may act as a state machine to interact with device under test 16 through network interface 44. Analysis module 58 may analyze messages communicated by device under test 16 as device under test 16 interacts with the interactor code to determine whether device under test 16 conforms to the design specification.

While this example includes specific functional components for validation device 12, validation device 12 may include any collection and arrangement of components, including some or all of the enumerated functional components, for validating designs and products at a high level of abstraction. Moreover, validation device 12 contemplates implementing each of the functional components using any suitable combination and arrangement of hardware and/or logic, and implementing any of the functionalities using a computer program stored on a computer readable medium. Furthermore, validation device 12 may be implemented as a stand alone device, or aspects of validation device 12 may be distributed among various devices.

Figure 3A:
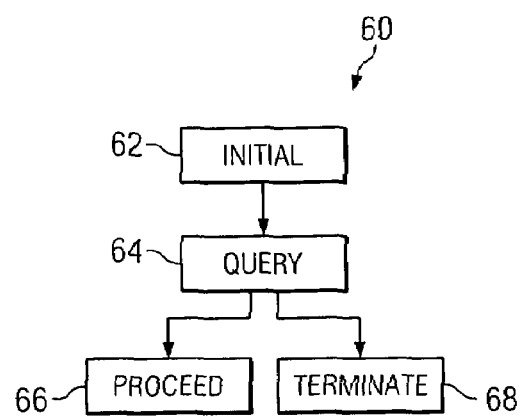
FIG. 3A illustrates a directed graph that includes multiple granular message diagrams.

FIG. 3A illustrates a directed graph 60. Directed graph 60 provides a simplified description of an automatic teller machine (ATM) authenticating a prospective user of the ATM using an ATM card and a personal identification number (PIN). Directed graph 60 describes a relationship of multiple functions to be performed by the ATM to authenticate the prospective user. The functions are defined by granular message diagrams which are represented by shapes. As illustrated, the shapes may be boxes. The arrows connecting the boxes describe an order in which the functions will be executed.

Directed graph 60 includes three functions, each defined by separate granular message diagrams represented by query box 64, proceed box 66, and terminate box 68. Initialization box 62 provides an entry point into directed graph 60. Thus, the arrow between initialization box 62 and query box 64 indicates that the granular message diagram associated with query box 64 is encountered after entry into directed graph 60. After communication of the messages defined in the granular message diagram represented by query box 64, execution continues either to proceed box 66 or terminate box 68.

Thus, directed graph 60 includes two scenarios. One scenario involves the path that proceeds through initial box 62, query box 64, and proceed box 66. This first scenario may be associated with the ATM accepting a PIN offered by the prospective user. Another scenario proceeds through the path through initial box 62, query box 64, and terminate box 68. This second scenario may be associated with the ATM rejecting a PIN submitted by the prospective user. Thus, directed graph 60 shows that the two scenarios have the same behavior until query box 64, but that the two scenarios differ query box 64. This information may be usefully exploited for verification and validation purposes since common portions of the two scenarios may not need to be repeated to completely test the design associated directed graph 60.

Note that the branch in directed graph 60 at query box 64 may be non-deterministic. In other words, directed graph 60 may not indicate whether proceed box 66 or terminate box 68 should be selected after query box 64. However, alternatively, a more expressive model may be used. Variables may be used to annotate paths and describe more precisely which path would be taken during execution. For example, guards and conditions may be utilized in association with transitions between granular message diagrams to provide for deterministic modeling.

Note that each granular message diagram represented by a box in directed graph 60 may utilize the same set of processes. Furthermore, a rule may be used in association with directed graph 60 that requires that each message defined by a particular granular message diagram must be exchanged before a next granular message diagram may be executed along a path.

Figure 3B:
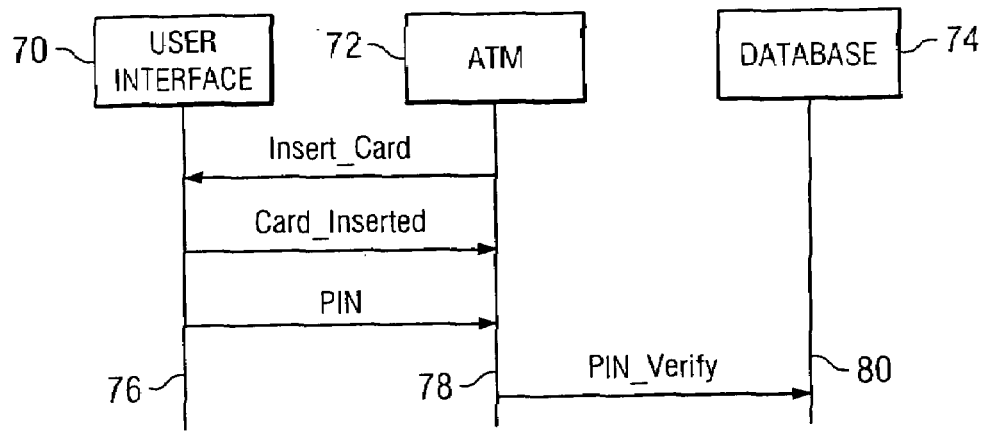
FIG. 3B illustrates a granular message diagram that includes multiple processes and messages.

FIG. 3B illustrates the granular message diagram associated with query box 64. The granular message diagram includes representations of multiple processes and messages. The processes are represented by user interface box 70, ATM box 72, and database box 74. Each process also includes a process line, including user interface line 76, ATM line 78, and database line 80. Horizontal arrows interconnecting the process lines indicate that messages are communicated between the processes.

Each message associates a sending process with a receiving process. Where a process line and a message intersect may be called an event. Each message then includes a send event associated with a sending process and a receive event associated with a receiving process. For example, the message insert_card couples ATM line 78 to user interface line 76. Thus, the message insert_card associates the ATM, the sending process, with the user interface, the receiving process. Furthermore, the intersection of the message insert_card with ATM process line 78 creates a send event and the intersection of the message insert_card with user interface process line 76 creates a receive event.

To further understand the relationships identified by granular message diagrams, two rules should be understood:
1. For any message m, the send event (s(m)) happens before the corresponding receive event (r(m)). Thus, s(m))<r(m); and
2. Events on a process line are ordered from top to bottom. These two rules indicate that granular message diagrams describe the order of messages communicated between processes. For example, using the first rule, the granular message diagram is understood to require that the send event associated with the message insert_card occurs before the receive event associated with the same message. Using the second rule, the granular message diagram is understood to require that the send event associated with the message insert_card occurs before the receive event associated with the message card_inserted.

Note that the above rules are transitive. For example, if in event e1 occurs before an event e2 (e1<e2) and event e2 occurs before an event e3 (e2<e3), then event e1 occurs before event e3 (e1<e3). However, these two rules may not define an ordered relationship between every message. For example, consider a granular message diagram that includes four processes but only two messages. If the first message is communicated between a first and a second process and the second message is communicated between a third and a fourth process, no ordered relationship between the two messages would be defined by the two rules. In that case, the two messages might occur in any order.

Using the ordering rules described above, one can interpret the granular message diagram depicted as requiring that the messages be communicated in the following order: insert_card, card_inserted, PIN, and PIN_verify. In other words, the ATM sends the message insert_card to the user interface. After receiving the message insert_card, the user interface communicates the message card_inserted to the ATM. After communicating the message card_inserted, the user interface communicates the message PIN to the ATM. After ATM box 72 receives the message PIN, the ATM communicates the message PIN_verify to the database. Note that the behavior depicted here is a behavior common to both of the scenarios described above with regard to the directed graph.

Figure 3C:
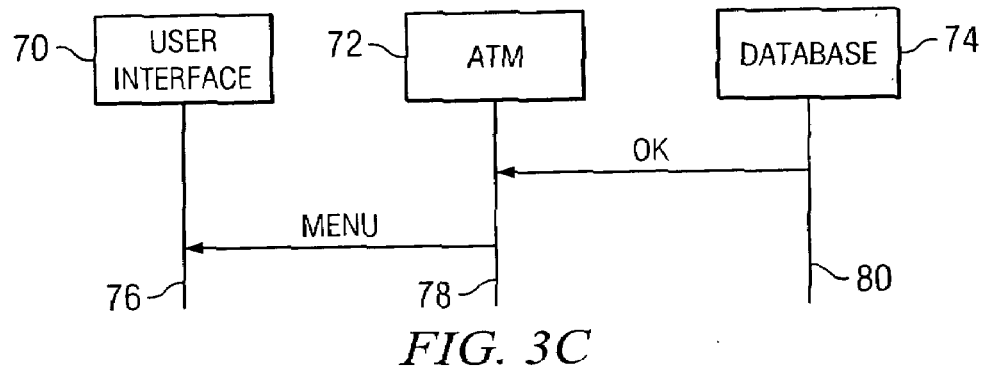
FIG. 3C illustrates a second granular message diagram that includes multiple processes and messages.

FIG. 3C illustrates the granular message diagram associated with proceed box 66. The granular message diagram includes representations of the same processes used in the granular message diagram associated with query box 64: user interface box 70, ATM box 72, and database box 74.

Using the ordering rules described above, one can interpret the granular message diagram as requiring that the messages be communicated in the following order: OK and menu. In other words, the database communicates the message OK to the ATM. After the ATM receives the message OK, the ATM communicates the message menu to the user interface.

Figure 3D:
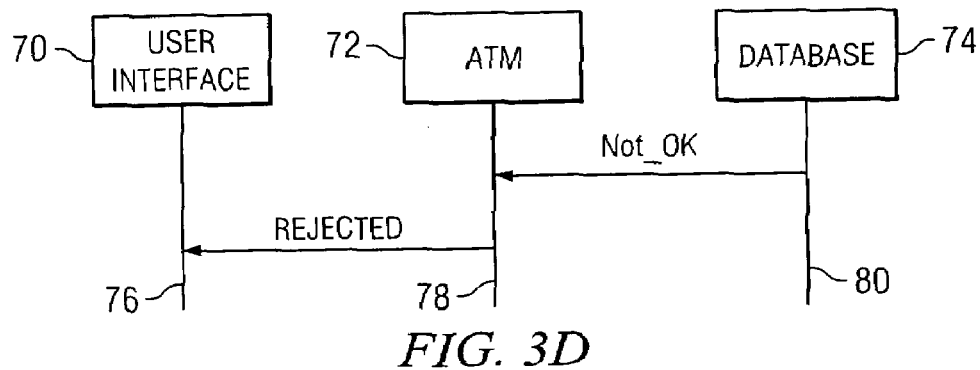
FIG. 3D illustrates a third granular message diagram that includes multiple processes and messages.

FIG. 3D illustrates the granular message diagram associated with terminate box 68. The granular message diagram includes representations of the same processes used in the granular message diagram associated with query box 64: user interface box 70, ATM box 72, and database box 74.

Using the ordering rules described above, one can interpret the granular message diagram as requiring that the messages be communicated in the following order: not_OK and rejected. In other words, the database communicates the message not_OK to the ATM. After the ATM receives the message not_OK, the ATM communicates the message rejected to the user interface.

Figure 4A:
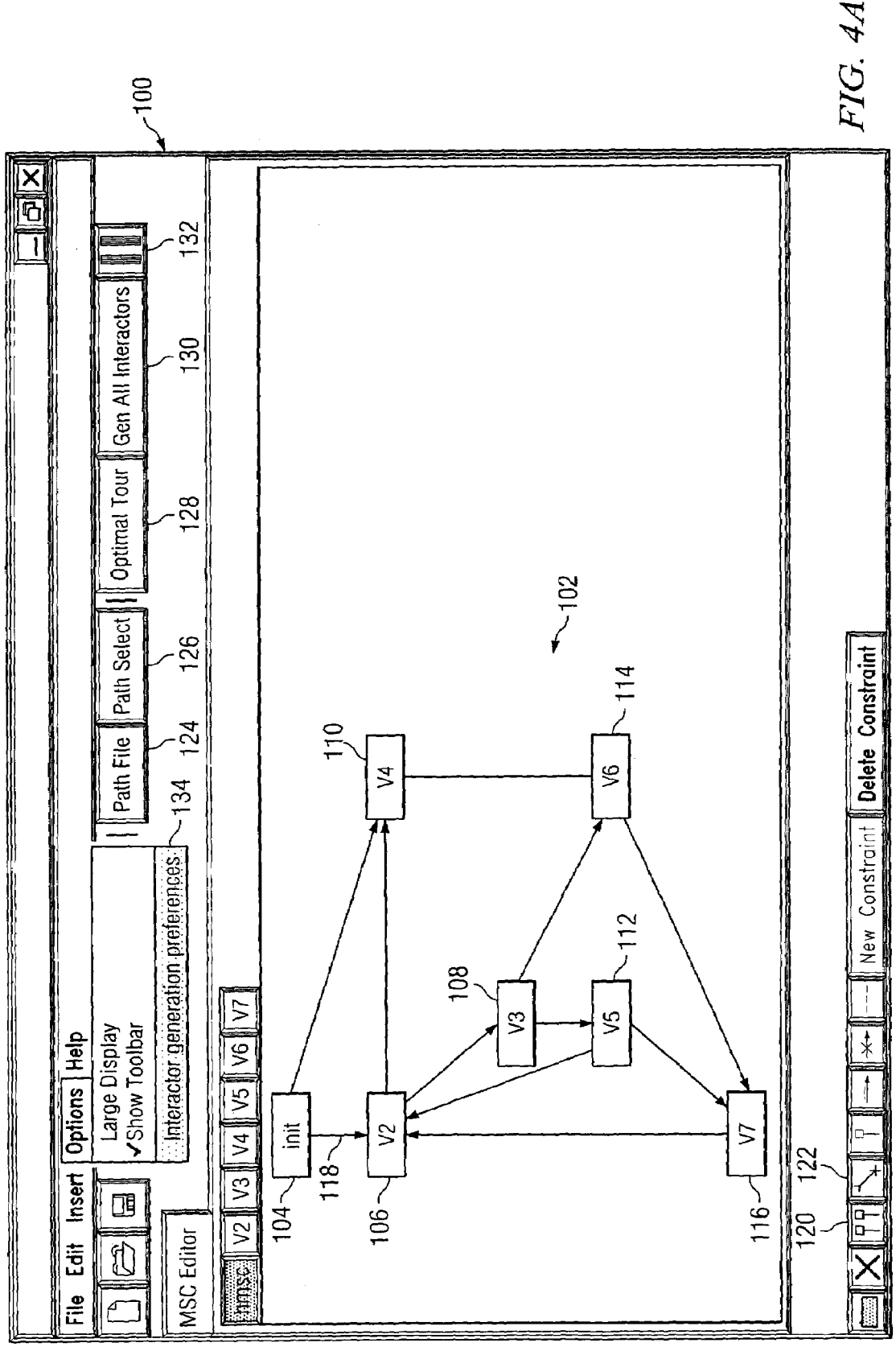
FIG. 4A illustrates an environment for developing a directed graph.

FIG. 4A illustrates an environment for developing a directed graph, identifying scenarios, and generating interactor code. Window 100 may be created by development tool 48. Window 100 includes canvass 102 as well as several buttons and menus. Canvass 102 provides an area for a user to construct a directed graph. Various aspects of window 100, including buttons 120 and 122, may be operated by a user to input information related to construction of a directed graph. Furthermore, buttons 124, 126, 128, and 130 may be operated by a user to cause development tool 48 to identify scenarios defined by the directed graph. In addition, menu option 134 may be operated by a user to specify preferences for generating interactor code.

In canvass 102, a user may draw the directed graph. Note that box 104 as illustrated is an initial box used for identifying an entry point into the directed graph. Box 104 may automatically be generated by development tool 48 and appear in canvass 102 for each directed graph. As illustrated, canvass 102 includes multiple representations of granular message diagrams, indicated by boxes 106, 108, 110, 112, 114, and 116. To create these representations of granular message diagrams, the user may select button 120. According to a particular embodiment, selection of button 120 may cause a dialog window to prompt the user for a name of the granular message diagram being created. Thus, as illustrated, box 106 may be illustrated and labeled v2.

After box 106 has been created, box 106 may be connected to box 104. For example, a user may select button 122. After selecting button 122, the user may select box 104 and then box 106. After selecting the two boxes in that order, arrow 118 may be drawn from box 104 to box 106. By drawing arrow 118, the user indicates that at least one scenario involves execution of box 104 before execution of box 106. Using similar procedures, a complex directed graph such as the directed graph illustrated in canvass 102 may be created. Note that canvass 102 illustrates one level of hierarchy, where all boxes represent granular message diagrams and only the top level is the directed graph. However, various other types of message diagrams, including a flattened message diagram, may be created.

After the creation of any box representing a granular message diagram, development tool 48 may prompt the user to define the processes and/or messages associated with the granular message diagram. To define processes and messages, a user may select one of the granular message diagrams illustrated in canvass 102 for editing. For example, a user may double click on box 106 in canvass 102. More detail regarding construction of granular message diagrams will be provided below.

After the directed graph has been created, window 100 may be utilized to identify scenarios and generate interactor code based on the identified scenarios. Various methods may be used to identify scenarios and generate interactor code using window 100. For example, a user may select button 124 to identify a file that includes an identification of a path through the directed graph. The file may identify boxes associated with granular message diagrams. Development tool 48 may read the file and verify that the scenario indicated is valid. After verifying that the scenario is valid, development tool 48 may generate interactor code based on the scenario. As described above, development tool 48 may generate interactor code for use by validation device 12 in testing device under test 16.

As another example, a user may select button 126 to allow the user to identify a path through the directed graph. According to particular embodiments, selection of button 126 and/or button 128 may cause development tool 48 to identify every possible path between two particular boxes in a directed graph. Development tool 48 may generate interactor code based on these identified scenarios.

Scenarios may be identified by development tool 48. For example, a user may select button 128 to cause development tool 48 to identify an optimal tour through the directed graph. According to particular embodiments, an optimal tour through the directed graph may involve edge coverage of a directed graph. As discussed above, edge coverage may involve use of a postman algorithm to identify a postman tour of the directed graph. The postman tour covers each edge of the directed graph at least once. One scenario may be identified as satisfying the requirements of a postman tour. However, note that a strongly connected directed graph will create a long scenario. Thus, because a postman tour may be long for a particularly complex directed graph, development tool 48 may allow the postman scenario to be "chopped" or divided into constituent pieces. For example, the postman scenario may be chopped according to some reoccurring granular message diagram in the path. Alternatively or in addition, the postman scenario may be chopped into multiple scenarios with a constraint requiring at least a minimum or no more than a maximum number of granular message diagrams be identified in each constituent scenario.

Applying a postman algorithm to the directed graph illustrated in FIG. 4A, the following scenario may be identified:

V2 V4 V6 V7 V2 V3 V6 V7 V2 V3 V5 V7 V2 V3 V5 V2

Other scenarios may also visit each edge at least once, but this scenario is the shortest scenario that satisfies the requirement that each edge be visited at least once. If a user desires not to use utilize one long scenario, the scenario may be divided into sections. One logical way of dividing a scenario is to chop the scenario on a recurring granular message diagram. For example, V2 may be used to chop the long scenario into four constituent scenarios:

V2 V4 V6 V7,

V2 V3 V6 V7,

V2 V3 V5 V7, and

V2 V3 V5 V2

To generate longer constituent scenarios, a user could require that chopping be performed using V2 and also that each scenario include at least five granular message diagrams. Using these constraints, the following two constituent scenarios may be identified:

V2 V4 V6 V7 V2 V3 V6 V7, and

V2 V3 V5 V7 V2 V3 V5 V2

Scenarios generated using these methods may also be used to generate interactor code.

Another way to identify scenarios and generate interactor code involves a user of window 100 selecting button 130. Selection of button 130 may cause development tool 48 to identify and create interactor code for all possible scenarios in the directed graph.

In addition to identifying scenarios, development tool 48 may perform what may be called scenario interference. Recall that messages and a granular message diagram have a partial ordered relationship based on deduction from the two rules identified above. Messages that are not ordered according to these rules may occur in any order in an implementation. For example, to identify all possible orders of messages included in two granular message diagrams, a user may select button 132 and the two boxes associated with the two granular message diagrams. In response, development tool 48 may generate all possible ordered relationships between messages in the two starting granular message diagrams and create multiple new granular message diagrams. Each new granular message diagram may illustrate a possible combination of the messages. A designer may analyze the generated granular message diagrams to determine whether any possible combination creates a problem with regard to execution of the design.

Thus, window 100 may be used by a user of development tool 48 to construct a directed graph, identify scenarios defined by the directed graph, generate interactor code based on at least one of the scenarios, and perform scenario interference.

Figure 4B:
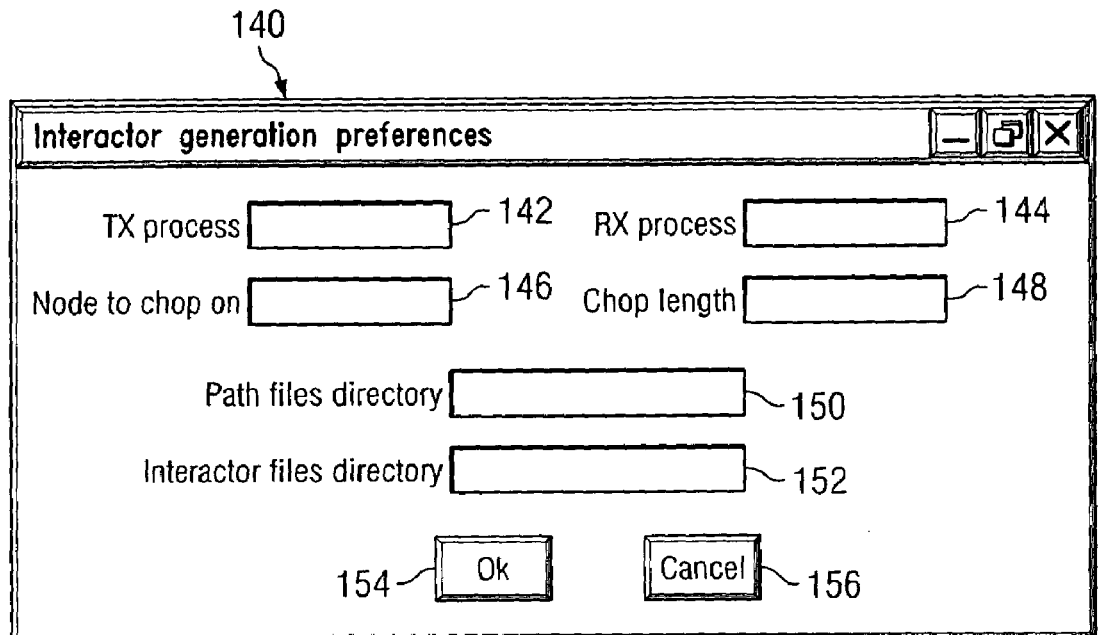
FIG. 4B illustrates a window for specifying preferences for generation of interactor code for use in validating designs and products.

FIG. 4B illustrates a window for specifying preferences for generation of interactor code used in validating designs and products. Window 140 includes an area 142 to identify a transmitting process and an area 144 to identify a receiving process. Given a particular directed graph, development tool 48 generates interactor code to function as the outside world to communicate with the system specified in the directed graph. Specifically, for any particular scenario, a state machine acting according to the interactor code receives all of the messages sent by the process identified in area 142 and sends all the messages received by the process identified in area 144. In this way, the state machine may validate the behavior of device under test 16 by sending messages to and receiving messages from device under test 16. If device under test 16 does not send messages according to the granular message diagrams identified by the scenario, an error may be generated and flagged. Analysis module 58 may analyze the error to determine whether a defect exists in device under test 16.

Window 140 includes an area 146 for a user to identify a granular message diagram and an area 148 for a user to identify a chop length. These inputs may be used by development tool 48 when identifying scenarios. As discussed above, a long scenario may be chopped or divided into constituent parts according to the inputs in areas 146 and 148. Development tool 48 may separate a long scenario at the node identified in area 146. Furthermore, a chop link may be identified in area 148 to determine a minimum length of constituent scenarios.

Directories of files associated with the generation of interactor code may be identified using areas 150 and 152. For example, the directory specified in area 150 may include files that identify scenarios. Furthermore, a directory where interactor code may be stored may be indicated in area 152.

When a user completes appropriate areas in window 140, the user may indicate the desire to store the preferences using button 126. Button 128 may be used to cancel the storing of preferences.

Figure 4C:
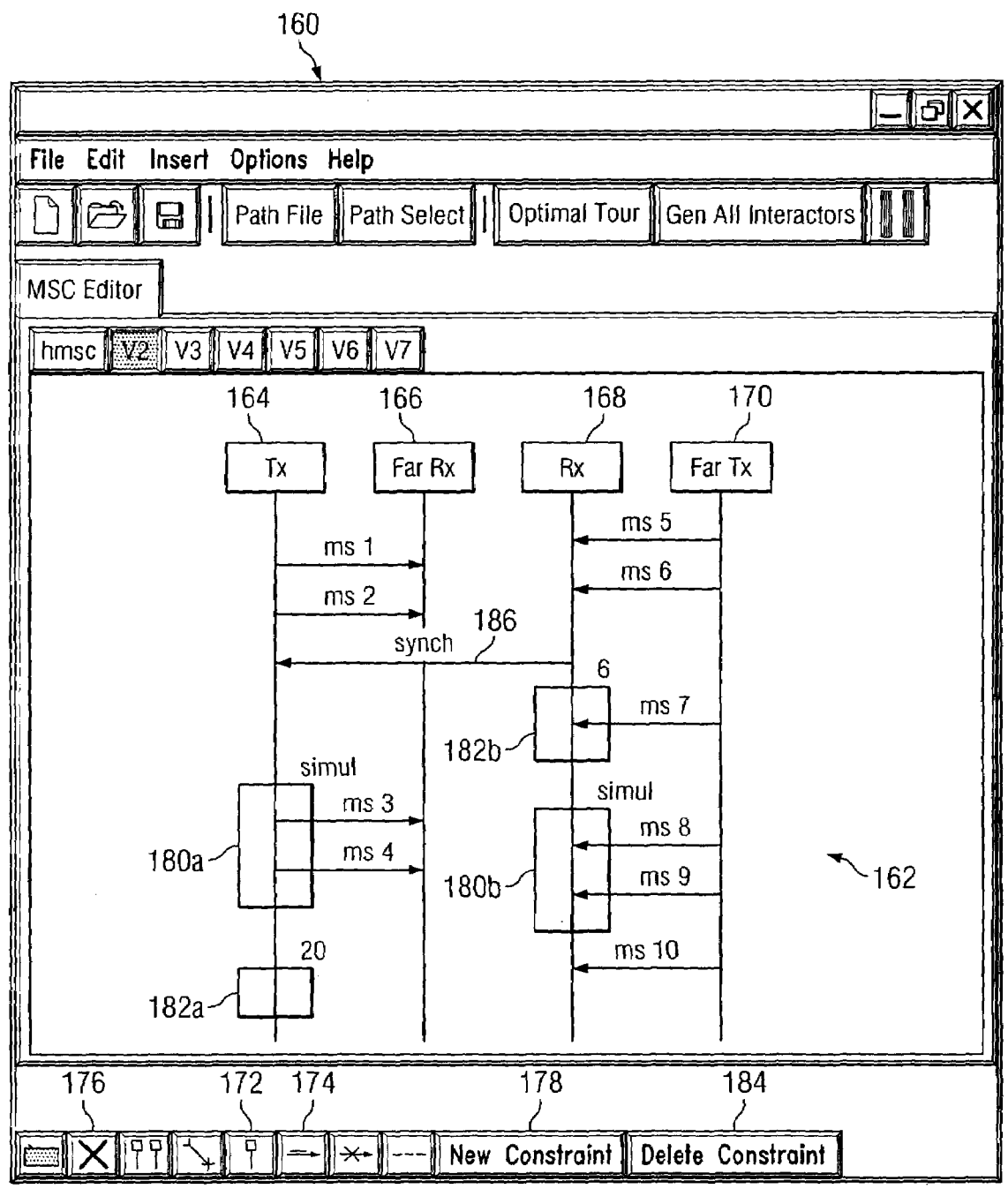
FIG. 4C illustrates an environment for developing a granular message diagram.

FIG. 4C illustrates an environment for developing a granular message diagram. Window 160 may be created by development tool 48. Window 160 includes canvass 162 as well as several buttons and menus. Canvass 162 provides an area for a user to construct a granular message diagram. Various aspects of window 160, including buttons 172, 174, 176, 178, and 184, may be operated by a user to input information related to construction of a granular message diagram.

In canvass 162, a user may draw a granular message diagram. To create a process, such as transmit process 164, far receive process 166, receive process 168 or far transmit process 170, the user may select button 172. After selection of button 172, a dialog box may prompt the user for a label for the process being generated before generating a representation of a process. Thus, to create the processes illustrated in canvass 124, a user may select button 172 four times and input each process with the illustrated names. Development tool 48 may generate the graphical representations of the processes. As illustrated, one embodiment includes process shapes and vertical process lines. However, various representations may be used.

Note that inclusion of processes in any one granular message diagram may create the same processes in other granular message diagrams included in the same directed graph. Thus, the processes may only be created once for granular message diagrams in the same directed graph.

After the processes have been created, messages may be indicated as being communicated between processes. To draw a representation of a message, a user may select button 174. A dialog box may accept a name for the message being illustrated, and the user may be able to indicate between which processes the message will be communicated. For example, the user may select one process and then a second process using a pointing tool. Development tool 48 may draw the message between the two processes indicated, with the first process having a send event and the second process having a receive event. Thus, using similar techniques, arrows ms1 through ms10 may be created to represent ten messages ms1 through ms10 communicated between the processes illustrated in the granular message diagram.

Note that button 176 may be used to delete a process or a message. For example, a user may select a representation of a message and then press button 176 to delete the selected message. Similarly, a user may select a representation of a process and then select button 176 to delete the selected process.

As discussed above, the granular message diagram may include advanced features. For example, constraints may be added to the granular message diagram being created by using button 178. According to particular embodiments, boxes may be drawn on process lines to group events. Events included in a box may indicate that the events should occur simultaneously. Thus, after selecting button 178, a user may draw a box around events and label the box "simul" to indicate that the box groups the events together into a simultaneous event. As illustrated, simultaneity constraints 180 have been included in the illustrated granular message diagram. Simultaneity constraint 180a groups send events associated with messages ms3 and ms4, while simultaneity constraint 180b groups receive events associated with messages ms8 and ms9.

Button 178 may also be utilized to create timeouts. When execution encounters a timeout constraint, execution may be paused until the timeout period indicated has elapsed. For timed execution models, execution continues only after the timeout period has elapsed. For non-timed execution models, timeout constraints indicate no operation. To specify a timeout, a user may follow the same steps as for drawing a simultaneity constraint, except that an integer may be given for the name of the constraint. The integer will represent the timeout value. According to particular embodiments, boxes may be drawn on process lines and labeled with numbers to indicate timeouts. Thus, after selecting button 178, a user may draw a box around events or on a process line and label the box with a number to indicate that the box causes a timeout event. As illustrated, timeout constraints 182 have been included in the illustrated granular message diagram. Timeout constraint 182a indicates a timeout of length 20 while timeout constraint 182b indicates a timeout of length 6. Note that a user may specify a unit of time to be associated with the values used by timeout constraints 182.

Timeout constraints and simultaneity constraints may be combined by drawing messages into or out of a timeout constraint. Message events in the timeout box occur simultaneously upon completion of the timeout period. For example, timeout constraint 182b coincides with a receive event at receive process 168. Thus, message ms7 will not be received by receive process 168 until after the expiration of the timeout of length 6 specified in the label of timeout constraint 182b.

Note that to delete constraint boxes, the user may select the constraint box to be deleted and select delete constraint 184. This process may be used for both timeout constraints and simultaneity constraints.

Events receive an ordered relationship when the events have a process in common or via transitive relationship involving common processes. For instance, consider a granular message diagram where a transmit module and a receive module do not communicate messages, but all of the communication behavior defined by the granular message diagram is with the outside world. In this case, the granular message diagram indicates that incoming messages are concurrent with outgoing messages and that no ordered relationship is imposed by the design.

To specify a particular order of messages, a synchronization edge may be used. Representations of synchronization edges may be drawn the same way as messages, except that a name "synch" may be used for synchronization edges. Messages labeled "synch" may be used to establish an ordered relationship through transitive deduction. For example, consider synchronization edge 186, which includes a send event involving receive process 168 and a receive event involving transmit process 164. Synchronization message 186 is illustrated as transmitted after receive process 168 receives message ms6. Synch message 186 is also illustrated as received at transmit process 164 before messages ms3 and ms4 are transmitted. Thus, using transitive deduction, according to the granular message diagram the reception of message ms6 at process 168 must occur before the transmission of messages ms3 and ms4 at process 164. Note that synchronization edges may create relationships between otherwise unrelated processes. According to particular embodiments, however, no message may actually be communicated between the processes related by a synchronization edge. Synchronization message 186 does not create an order as between messages ms1 and ms2 as compared with messages ms5 and ms6. Synchronization message 186 however forces send events associated with messages ms3 and ms4 to occur after the receive events associated with messages ms5 and ms6. Synchronization message 186 also does not enforce an ordered relationship between message ms7 and message ms2. To enforce an ordered relationship between these messages, synchronization edge 186 should be directed from process 164 to process 168.

Thus, the granular message diagram in window 100 includes three advanced features, simultaneity constraints 180, timeout constraints 182, and synchronization edge 186.

Figure 5A:
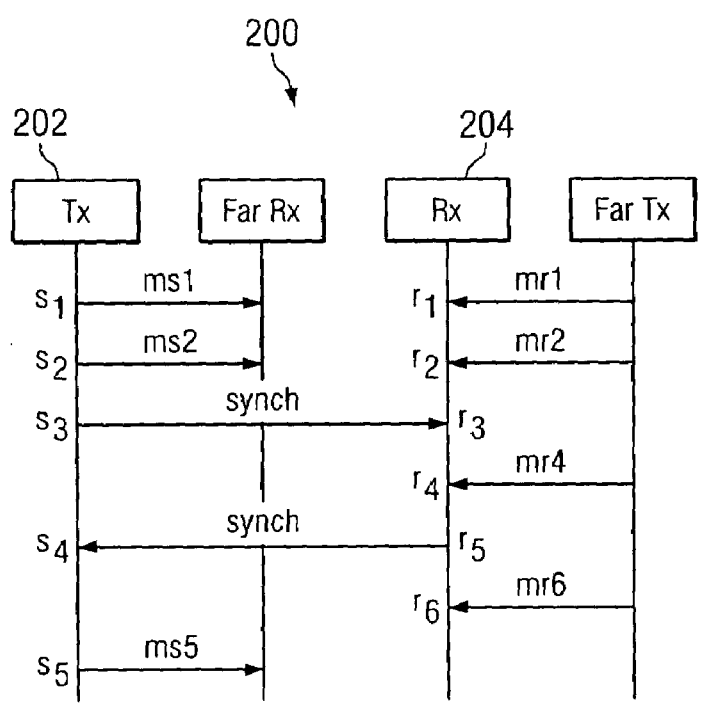
FIG. 5A illustrates a granular message diagram.

FIG. 5A illustrates a granular message diagram 200. Granular message diagram 200 will be used to illustrate one method of generating interactor code. To convert a directed graph into interactor code, events defined by each granular message diagram in the directed graph may be used to identify states of a finite state machine. Granular message diagrams define permissible orders of events, and events completed at each process correspond to states. For example, the initial state corresponds to no events completed at any process. The final state corresponds to all events completed at each process.

Now considering granular message diagram 200, a subset of granular message diagram 200 may be projected into a finite state machine by considering the event sets of a subset of the processes. For example, for granular message diagram 200, a finite state machine may be generated for transmit process 202 and receive process 204. As illustrated, transmit process 202 includes events s1 through s5, and receive process 204 includes events r1 through r6. Note that transmit process 202 and receive process 204 never exchange messages but are related by two synchronization edges.

Figure 5B:
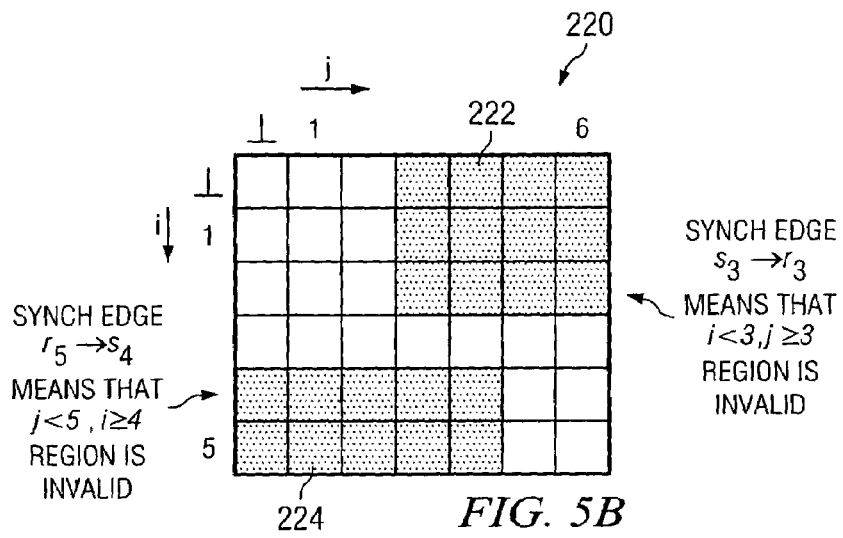
FIG. 5B illustrates a state matrix.

FIG. 5B illustrates a state matrix 220 associated with granular message diagram 200. State matrix 220 will be used to further explain how to generate interactor code. With only two processes, a state machine for granular message diagram 200 can be visualized as a two dimensional matrix of states. Each box in state matrix 220 corresponds to a state where transmit process 202 has finished event $s_i$ and receive process 204 has finished event $r_j$. Thus, each box in state matrix 220 defines a state ($s_i$, $r_j$). Note that the origin of state matrix 220 is at the upper left hand corner, where the initial state is shown for each process using the symbol ⊥. Since the upper left corner of state matrix 220 is the initial state, the state transitions may be identified by tracing to the right and down from each state. The final state would be the lower right corner.

If transmit process 202 and receive process 204 were not related by the two synchronization edges, state matrix 220 might be a full two dimensional n×m matrix of states, where n is the number of messages sent by transmit process 202 and m is the number of messages received by receive process 204. However, the presence of synchronization edges in granular message diagram 200 reduces the number of valid states as shown in state matrix 220. Due to the synchronization edges, some states illustrated in state matrix 220 are not valid and can be "crossed" out of the two dimensional matrix. For example, consider that event s3 is a send event corresponding to a synchronization edge from transmit process 202 to receive process 204. Event r3 is the corresponding receive event associated with the same synchronization edge. Any event at receive process 204 occurring after receive event r2 has to occur after event s3. Thus, events r3 through r6 cannot occur before event s3. Using this process, region 222 of state matrix 220, which corresponds to non-valid states, may be crossed out. A similar process may be used to cross out region 224, which is associated with the second synchronization edge in granular message diagram 200. The remaining matrix represents granular message diagram 200 correctly. A state such as $s_2$, $r_1$ represents the state where transmit process 202 has finished send event $s_2$, and receive process 204 has finished receive event $r_1$.

Figure 5C:
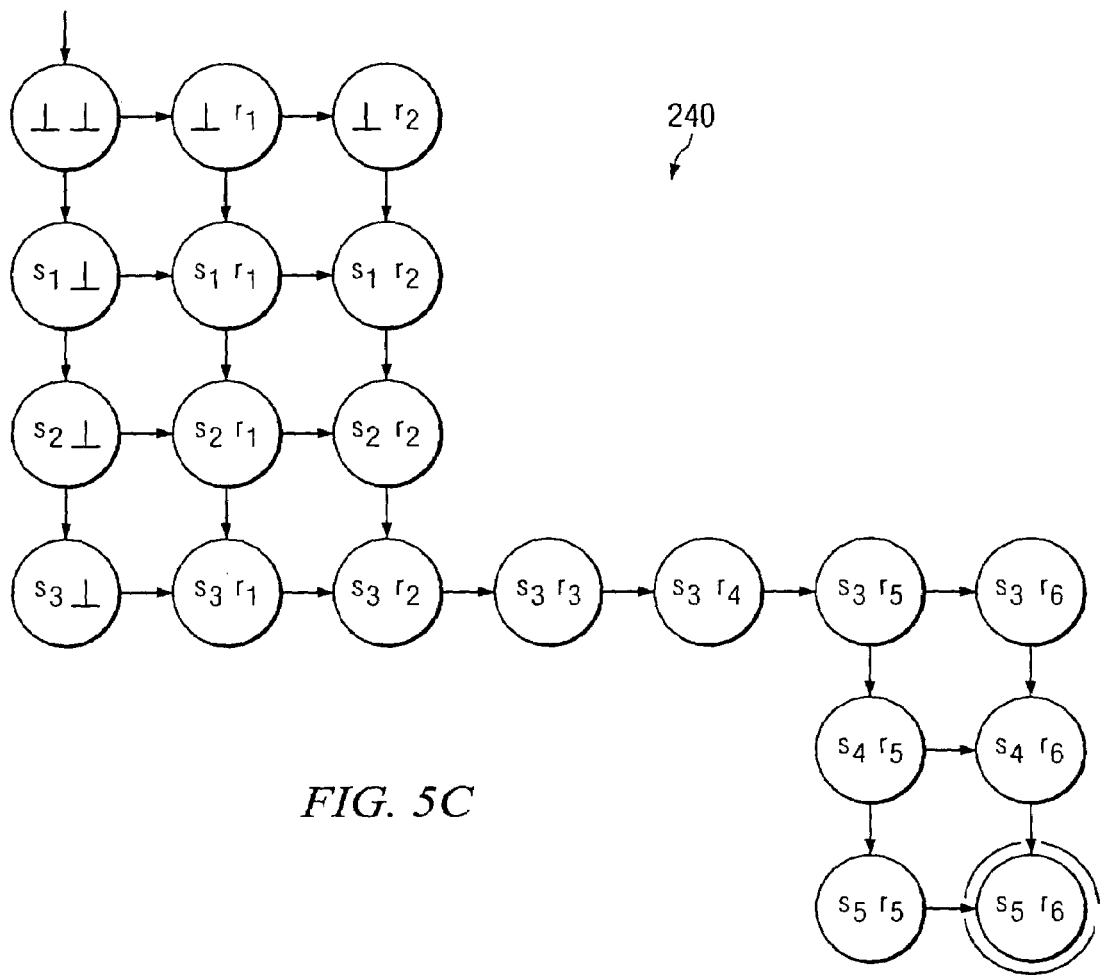
FIG. 5C illustrates a state diagram.
Figure 5D:
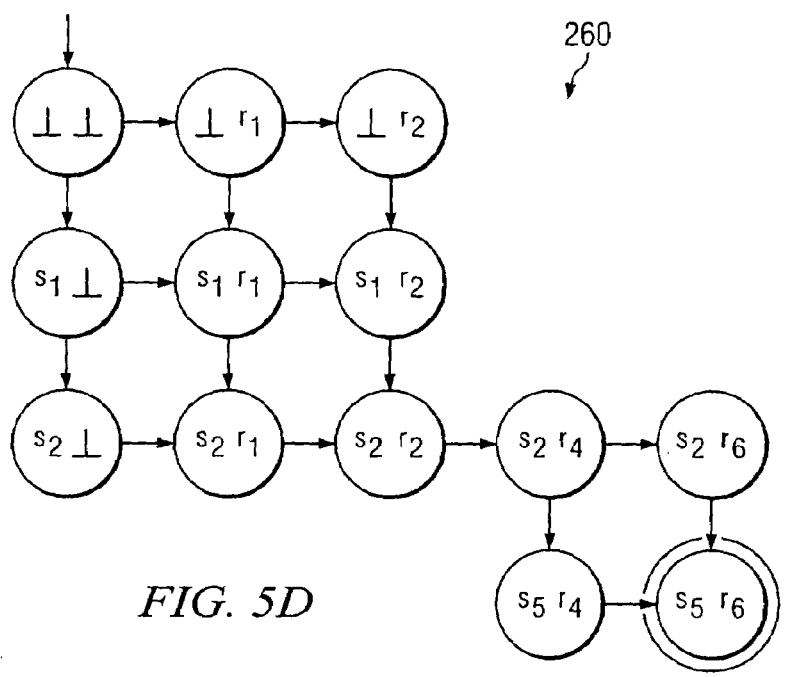
FIG. 5D illustrates a simplified state diagram.

FIG. 5C illustrates a state diagram 240 associated with state matrix 220. However, synchronization events may be removed from state diagram 240 since the synchronization events serve only to constrain the partial ordering of the actual behavioral events with the outside world or another device. Eliminating the synchronization events results in simplified state diagram 260, which is illustrated in FIG. 5D.

To implement the finite state machine, interactor code may be created in a language such as Verilog. To generate the interactor code, the roles of transmit process 202 and receive process 204 may be reversed. In other words, if the behavior calls for the reception of a message, then the interactor code should send the message. If the behavior calls for sending a message, then the interactor code should be waiting for the message. Each horizontal transition in simplified state diagram 260 corresponds to receiving a message and therefore is implemented as sending a message in the interactor code. Analogously, each vertical transition in simplified state diagram 260 corresponds to sending a message and is therefore implemented as waiting to receive a message in the interactor code.

When the current state is a state (i, j) where both horizontal and vertical transitions in simplified state diagram 260 can be taken, the horizontal transition may be taken by sending the appropriate message, and then the vertical transition may be attempted by determining if an expected message has been received. If the latter condition is satisfied, then the vertical transition may be taken as well, and the next state is state (i+1, j+1). If the latter condition is not satisfied, then only the horizontal transition is taken and the next state is state (i+1, j). A timer may be used while waiting to receive a message so that the process will not wait forever. In other words, the wait may be terminated after a suitable timeout period. If only a vertical or horizontal transition can be taken from a particular state, then only those behaviors may be generated.

While the direction of the transition is one variable affecting the interactor code that may be generated, another variable is the particular type of the event associated with a particular state. For transmit process 202 and receive process 204, each event associated with the process line is one of three types. For transmit process 202, these types are a message send event, a timer initiation event, and a timeout signal reception event. For receive process 204, these types are a message receive event, a timer initiation event, and a timeout signal reception event. These three types of events for each process result in nine different combinations that may be considered during code generation because the code generated for each state in the finite state machine depends on the exact combination in that particular state.

Using these techniques, interactor code may be generated for a granular message diagram. Recall that a scenario is simply a path in a directed graph. To generate interactor code for a scenario, code may be generated for each granular message diagram along the path and combined as appropriate. For instance, the next state at the end of one granular message diagram should be the first state of the next granular message diagram along the path. By combining all of the signal and variable declarations, the interactor code can be generated, compiled, and simulated against device under test 16 without manual intervention.

Figure 6:
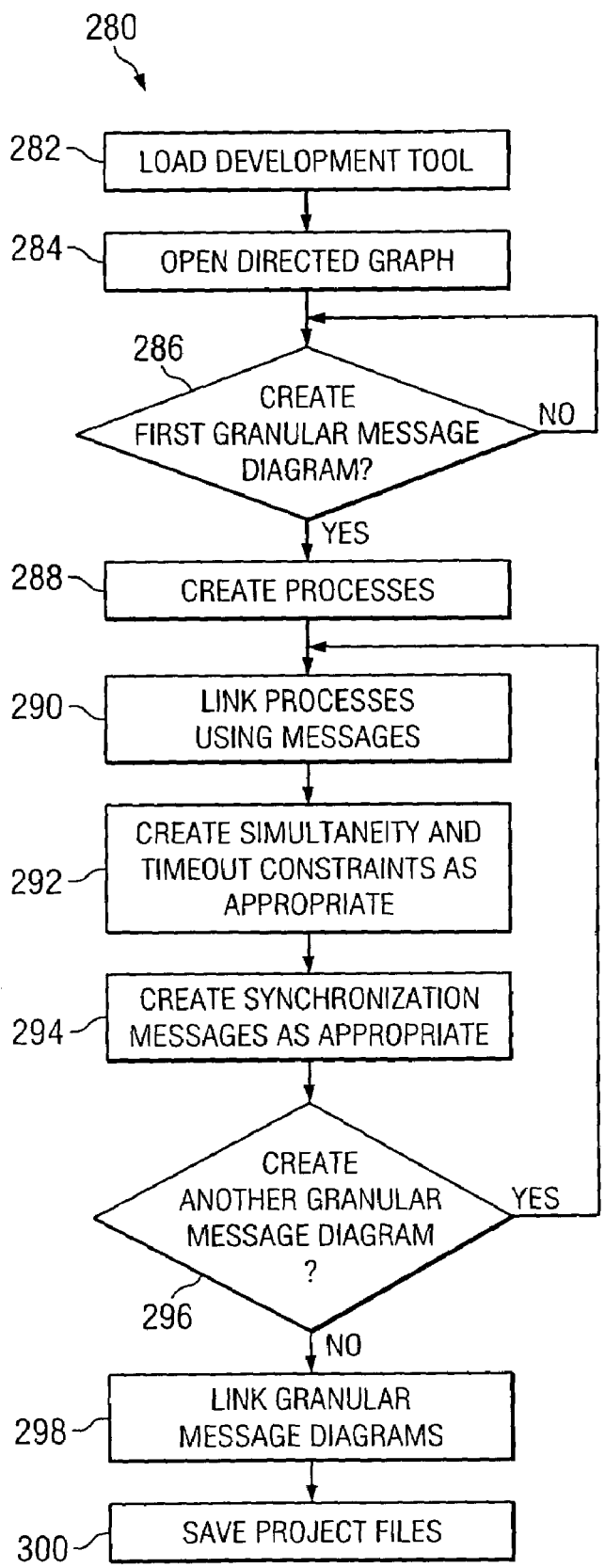
FIG. 6 is a flowchart illustrating a method for developing a directed graph with one or more granular message diagrams.

FIG. 6 is a flowchart illustrating a method 280 for developing a directed graph with one or more granular message diagrams. Validation device 12 loads development tool 48 at step 282. Development tool 48 opens a new directed graph at step 284. At step 286, development tool 48 determines whether a user has indicated to create a first granular message diagram.

Once a user indicates to create a granular message diagram, the user is allowed to create representations of processes at step 288. The user may link the representations of processes using messages at step 290. Furthermore, the user may create simultaneity and timeout constraints as appropriate at step 292. In addition, the user may create synchronization edges as appropriate at step 294. At step 296, development tool 48 determines whether the user desires to create another granular message diagram. If the user desires to create another granular message diagram, method 280 returns to step 290.

If no more granular message diagrams will be created, the user links representations of the granular message diagrams at step 298. For example, arrows may be generated connecting representations of the granular message diagrams to one another. These arrows indicate orders of possible execution of the communications depicted in the granular message diagrams. At step 300, development tool 48 may save project files including the directed graph and the granular message diagrams.

Thus, method 280 illustrates one embodiment of steps that may be taken to create a message diagram for use in validating a design or a project at a high level of abstraction.

Figure 7:
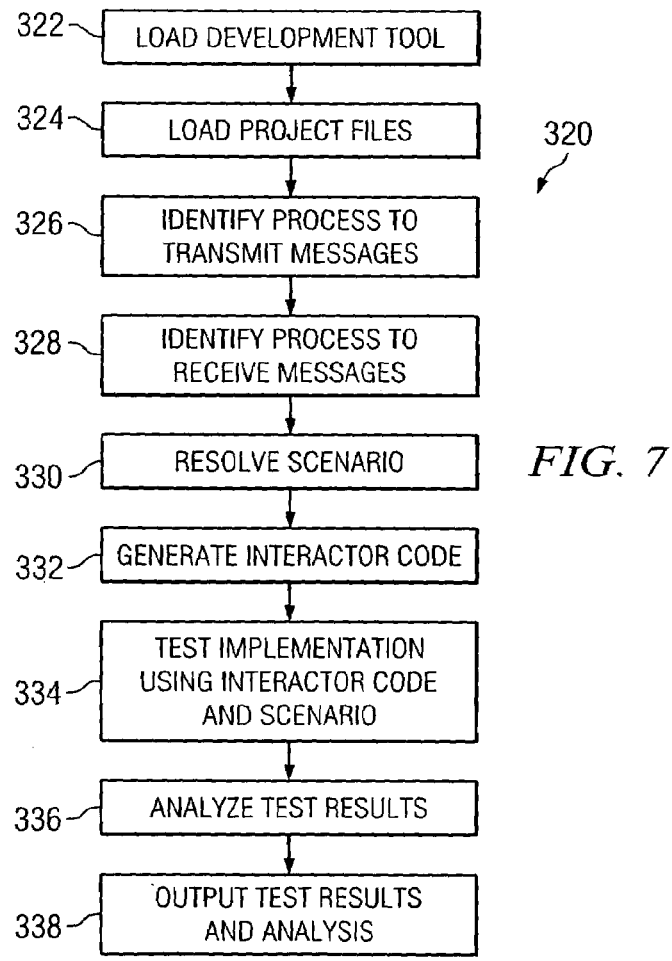
FIG. 7 is a flowchart illustrating a method for validating an implementation of a design using a directed graph and one or more granular message diagrams.

FIG. 7 is a flowchart illustrating a method 320 for validating an implementation of a design using a directed graph and one or more granular message diagrams. Validation device 12 loads development tool 48 at step 322. Development tool 48 loads project files associated with a completed directed graph and granular message diagrams at step 324.

A user identifies a process to fulfill the role of the transmitting process at step 326. Similarly, the user identifies a process to fulfill the role of the receiving process at step 328. By identifying the transmitting and receiving processes, the user identifies which processes will function as the outside world to communicate with the system specified in the message diagram.

Development tool 48 resolves one or more scenarios at step 330. For example, using a postman algorithm, development tool 48 may identify a scenario that covers all edges in the directed graph. Alternatively or in addition, scenarios may be created by a user identifying two granular message diagrams in the directed graph and development tool 48 resolving all scenarios between the two identified granular message diagrams. Furthermore, the user may identify a particular scenario by identifying a particular path through a directed graph. As another example, development tool 48 may identify all possible scenarios given the directed graph.

Development tool 48 generates interactor code for validating device under test 16 using the identified scenarios at step 332. As discussed above, the interactor code may act as a state machine to interact with device under test 16. In particular embodiments, device under test 16 may be a manufactured hardware or software product. Thus, the interactor code may attempt to interact with the manufactured product according to the directed graph and granular message diagrams. Alternatively, device under test 16 may be the interactor code itself. In other words, the interactor code may attempt to communicate with another copy of itself to determine whether the design is robust. Various other implementations of the design may be tested in analogous ways.

At step 334, validation device 12 tests an implementation of the design using the interactor code. Messages may be communicated to the implementation according the directed graph and granular message diagrams. Messages may also be received from the implementation. Analysis module 58 analyzes the test results at step 336. Analysis may include determining when the implementation fails to communicate according to the directed graph and granular message diagrams. Test results and the analysis of the test results may be outputted at step 338. For example, the test results and analysis may be output by development tool 48 to a user for further analysis.

Thus, method 320 illustrates one embodiment of steps that may be taken to validate a design or a project at a high level of abstraction. An implementation of the design may be tested by analyzing whether the implementation communicates messages according to the specification recorded in the directed graph and granular message diagrams.

The preceding flowcharts illustrate particular methods used to validate designs and products at a high level of abstraction. However, these flowcharts illustrate only exemplary methods of operation, and the present invention contemplates any suitable techniques, elements, and applications for performing these functions. Thus, many of the steps in the flowcharts may take place simultaneously and/or in different orders than as shown. In addition, methods may include additional steps or fewer steps, so long as the methods remain appropriate.

Although the present invention has been described in several embodiments, a myriad of changes of modifications may be suggested to one skilled in the art, and it is intended that the present invention encompass such changes and modifications as fall within the present appended claims.

What is claimed is:

1. A method for high level validation of a designed product, comprising:
receiving input associated with a design of a product;
generating a message diagram in response to the input, wherein the message diagram describes a relationship of messages communicated between a plurality of processes;
generating, in response to the input, a selected one of: a simultaneity constraint that requires that a plurality of events occur within a time period, a timeout constraint that requires that execution pauses for a time period, and a synchronization message indicator that establishes an order between otherwise unordered messages:
resolving at least one scenario from the message diagram, wherein the at least one scenario comprises a particular sequence of messages identified by the message diagram;
generating a state machine operable to receive and transmit at least some of the messages identified by the message diagram according to the at least one scenario; and
testing an implementation of the design of the product using the state machine.

2. The method of claim 1, wherein the message diagram comprises a graphical representation illustrating the relationship of the messages communicated between the processes.

3. The method of claim 1, wherein the message diagram comprises:
a directed graph, wherein the directed graph describes a relationship between a plurality of granular message diagrams; and
the plurality of granular message diagrams, wherein each of the plurality of granular message diagrams describes a relationship of a subset of the messages described in the message diagram.

4. The method of claim 3, further comprising:
identifying a path through the message diagram that traverses each edge of the directed graph at least once, wherein each edge couples two granular message diagrams; and
resolving the at least one scenario based on the path.

5. The method of claim 3, further comprising:
identifying all paths between a first granular message diagram and a second granular message diagram; and
resolving a scenario for each identified path.

6. The method of claim 3, further comprising:
receiving an identification of a path through the message diagram; and
resolving the at least one scenario based on the identified path.

7. The method of claim 3, further comprising:
identifying two granular message diagrams; and
generating all possible combinations of the two granular message diagrams based on ordering relationships between messages in the two granular message diagrams.

8. The method of claim 1, wherein:
the implementation comprises a manufactured product; and
the step of testing an implementation comprises:
coupling the state machine to the manufactured product; and
attempting to interact with the manufactured product according to the at least one scenario.

9. The method of claim 1, wherein:
the implementation comprises a second state machine operable to receive and transmit at least some of the messages identified by the message diagram according to the at least one scenario; and
the step of testing an implementation comprises:
coupling the state machine to the second state machine; and
attempting to interact with the second state machine according to the at least one scenario.

10. The method of claim 1, wherein the input comprises a series of indications generated by a mouse and a keyboard.

11. A device for high level validation of a designed product, comprising:
a user interface operable to receive input associated with a design of a product;
a controller operable to generate a message diagram in response to the input, wherein the message diagram describes a relationship of messages communicated between a plurality of processes, to generate, in response to the input, a selected one of: a simultaneity constraint that requires that a plurality of events occur within a time period, a timeout constraint that requires that execution pauses for a time period, and a synchronization message indicator that establishes an order between otherwise unordered messages, to resolve at least one scenario from the message diagram, wherein the at least one scenario comprises a particular sequence of messages identified by the message diagram, to generate a state machine operable to receive and transmit at least some of the messages identified by the message diagram according to the at least one scenario, and to test an implementation of the design of the product using the state machine.

12. The device of claim 11, wherein the message diagram comprises a graphical representation illustrating a relationship between the messages and the processes.

13. The device of claim 11, wherein the message diagram comprises:
a directed graph, wherein the directed graph describes a relationship between a plurality of granular message diagrams; and
the plurality of granular message diagrams, wherein each of the plurality of granular message diagrams describes a relationship of a subset of the messages described in the message diagram.

14. The device of claim 13, wherein the controller is further operable to:
identify a path through the message diagram that traverses each edge of the directed graph at least once, wherein each edge couples two granular message diagrams; and
resolve the at least one scenario based on the path.

15. The device of claim 13, wherein the controller is further operable to:
identify all paths between a first granular message diagram and a second granular message diagram; and
resolve a scenario for each identified path.

16. The device of claim 13, wherein the controller is further operable to:

receive an identification of a path through the message diagram; and resolve the at least one scenario based on the identified path.

17. The device of claim 13, wherein the controller is further operable to:

identify two granular message diagrams; and generate all possible combinations of the two granular message diagrams based on ordering relationships between messages in the two granular message diagrams.

18. The device of claim 11, wherein:

the implementation comprises a manufactured product; and the controller is further operable to test the implementation by:

coupling the state machine to the manufactured product; and attempting to interact with the manufactured product according to the at least one scenario.

19. The device of claim 11, wherein:

the implementation comprises a second state machine operable to receive and transmit at least some of the messages identified by the message diagram according to the at least one scenario; and the controller is further operable to test the implementation by:

coupling the state machine to the second state machine; and attempting to interact with the second state machine according to the at least one scenario.

20. The device of claim 11, wherein the input comprises a series of indications generated by a mouse and a keyboard.

21. Logic for high level validation of a designed product, the logic encoded in media and operable when executed to:

receive input associated with a design of a product;

generate a message diagram in response to the input, wherein the message diagram describes a relationship of messages communicated between a plurality of processes;

generate, in response to the input, a selected one of: a simultaneity constraint that requires that a plurality of events occur within a time period, a timeout constraint that requires that execution pauses for a time period, and a synchronization message indicator that establishes an order between otherwise unordered messages;

resolve at least one scenario from the message diagram, wherein the at least one scenario comprises a particular sequence of messages identified by the message diagram;

generate a state machine operable to receive and transmit at least some of the messages identified by the message diagram according to the at least one scenario; and test an implementation of the design of the product using the state machine.

22. The logic of claim 21, wherein the message diagram comprises a graphical representation illustrating a relationship between the messages and the processes.

23. The logic of claim 21, wherein the message diagram comprises:

a directed graph, wherein the directed graph describes a relationship between a plurality of granular message diagrams; and the plurality of granular message diagrams, wherein each of the plurality of granular message diagrams describes a relationship of a subset of the messages described in the message diagram.

24. The logic of claim 23, further operable when executed to:

identify a path through the message diagram that traverses each edge of the directed graph at least once, wherein each edge couples two granular message diagrams; and resolve the at least one scenario based on the path.

25. The logic of claim 23, further operable when executed to:

identify all paths between a first granular message diagram and a second granular message diagram; and resolve a scenario for each identified path.

26. The logic of claim 23, further operable when executed to:

receive an identification of a path through the message diagram; and resolve the at least one scenario based on the identified path.

27. The logic of claim 23, further operable when executed to:

identify two granular message diagrams; and generate all possible combinations of the two granular message diagrams based on ordering relationships between messages in the two granular message diagrams.

28. The logic of claim 21, wherein:

the implementation comprises a manufactured product; and the logic is further operable when executed to test the implementation by:

coupling the state machine to the manufactured product; and attempting to interact with the manufactured product according to the at least one scenario 29. The logic of claim 21, wherein:

the implementation comprises a second state machine operable to receive and transmit at least some of the messages identified by the message diagram according to the at least one scenario; and the logic is further operable when executed to test the implementation by:

coupling the state machine to the second state machine; and attempting to interact with the second state machine according to the at least one scenario.

30. The logic of claim 21, wherein the input comprises a series of indications generated by a mouse and a keyboard.

31. A system for high level validation of a designed product, comprising:

means for receiving input associated with a design of a product;

means for generating a message diagram in response to the input, wherein the message diagram describes a relationship of messages communicated between a plurality of processes;

means for generating, in response to the input, a selected one of: a simultaneity constraint that requires that a plurality of events occur within a time period, a timeout constraint that requires that execution pauses for a time period, and a synchronization message indicator that establishes an order between otherwise unordered messages;

means for resolving at least one scenario from the message diagram, wherein the at least one scenario comprises a particular sequence of messages identified by the message diagram;

means for generating a state machine operable to receive and transmit at least some of the messages identified by the message diagram according to the at least one scenario; and means for testing an implementation of the design of the product using the state machine.

32. The system of claim 31, wherein the message diagram comprises a graphical representation illustrating a relationship between the messages and the processes.

33. The system of claim 31, wherein the message diagram comprises:
a directed graph, wherein the directed graph describes a relationship between a plurality of granular message diagrams; and
the plurality of granular message diagrams, wherein each of the plurality of granular message diagrams describes a relationship of a subset of the messages described in the message diagram.

34. The system of claim 33, further comprising:
means for identifying a path through the message diagram that traverses each edge of the directed graph at least once, wherein each edge couples two granular message diagrams; and
means for resolving the at least one scenario based on the path.

35. The system of claim 33, further comprising:
means for identifying all paths between a first granular message diagram and a second granular message diagram; and
means for resolving a scenario for each identified path.

36. The system of claim 33, further comprising:
means for receiving an identification of a path through the message diagram; and
means for resolving the at least one scenario based on the identified path.

37. The system of claim 33, further comprising:
means for identifying two granular message diagrams; and
means for generating all possible combinations of the two granular message diagrams based on ordering relationships between messages in the two granular message diagrams.

38. The system of claim 31, wherein:
the implementation comprises a manufactured product; and
the means for testing an implementation comprises:
means for coupling the state machine to the manufactured product; and
means for attempting to interact with the manufactured product according to the at least one scenario.

39. The system of claim 31, wherein:
the implementation comprises a second state machine operable to receive and transmit at least some of the messages identified by the message diagram according to the at least one scenario; and
the means for testing an implementation comprises:
means for coupling the state machine to the second state machine; and
means for attempting to interact with the second state machine according to the at least one scenario.

40. The system of claim 31, wherein the input comprises a series of indications generated by a mouse and a keyboard.

* * * * *